United States Patent Office 3,241,056
Patented Mar. 15, 1966

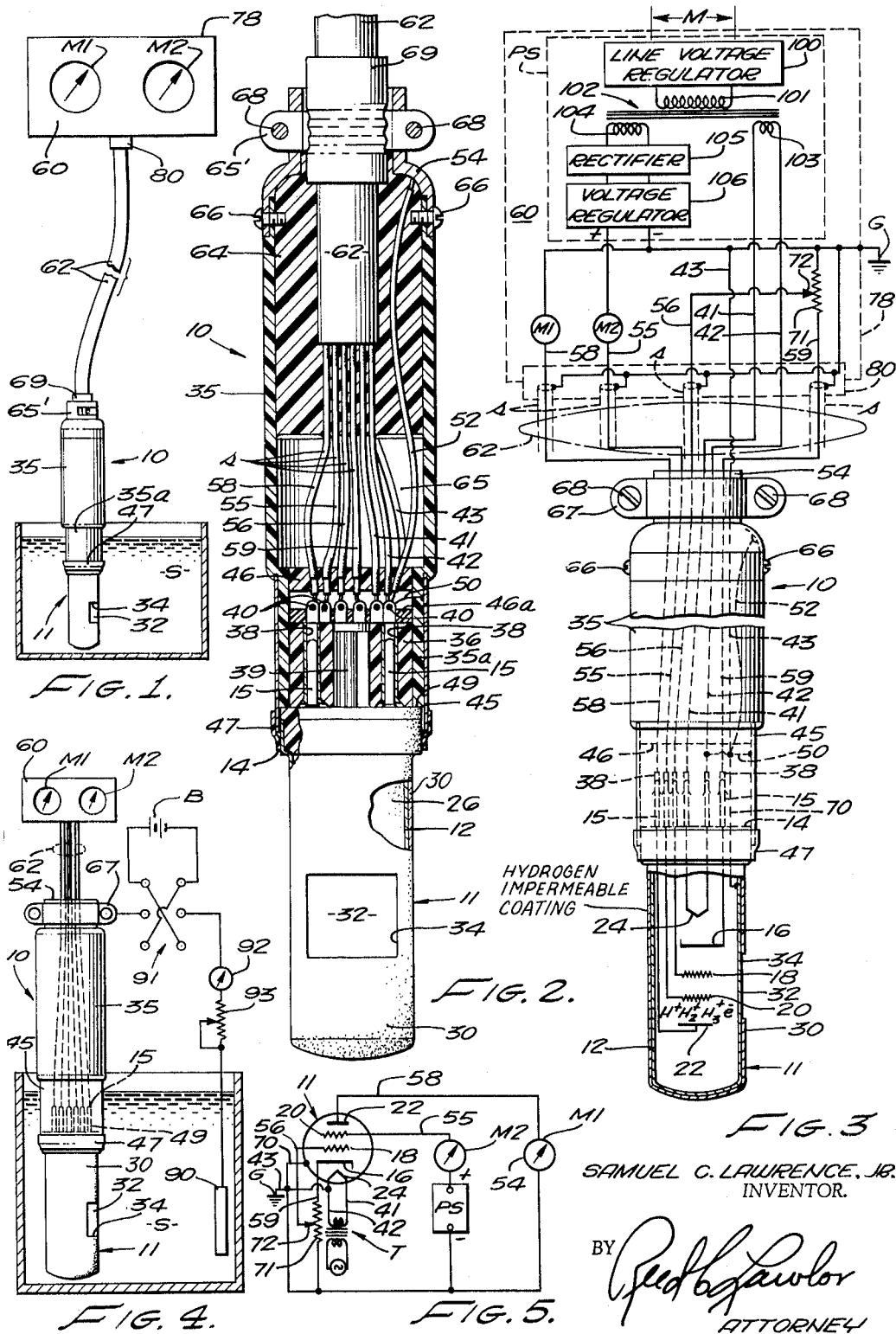

3,241,056
HYDROGEN DETECTOR PROBE SYSTEM AND
HYDROGEN DETECTOR PROBE HOLDER
Samuel C. Lawrence, Jr., 1814 S. 142nd Place,
Seattle 88, Wash.
Filed Mar. 8, 1961, Ser. No. 94,340
13 Claims. (Cl. 324—33)

This invention relates to electrical testing equipment, and more particularly to electronic equipment employed for testing for the presence and extent of hydrogen diffusing in hydrogen-carrying or generating fluids.

It is well known that many metals, especially steel, are embrittled by virtue of hydrogen contained in them. The phenomenon resulting in such embrittlement is called hydrogen embrittlement. Whether such gas is present in molecular form or atomic form or both is still undetermined. Though there may be some question as to the form in which the hydrogen exists in the metal, the hydrogen that is present there may be referred to as dissolved or absorbed hydrogen.

Hydrogen that causes embrittlement of metal may enter the metal in various ways. For example, hydrogen may enter a piece of metal while the surface of the metal is being cleaned with a paint solvent. Hydrogen responsible for embrittlement may also enter metal during the course of oxidation of the metal surface that occurs while the metal is exposed to a humid atmosphere for a prolonged period. Such embrittlement reduces the strength and hence the life of any object made from such steel.

The rate at which hydrogen can effuse from a fluid into a metallic object can be measured to some degree of accuracy by submerging an electron discharge device, often referred to hereinafter simply as a tube, or vacuum tube, or electron discharge tube, or electronic tube, in the body of the fluid and then determining the effect that such immersion has on the electronic characteristics of the tube. Phenomena of these types have previously been reported. See, for example, "Diffusion of Hydrogen from Water through Steel" by Francis J. Norton, Journal of Applied Physics, vol. 11, pp. 262ff April 1940. See also United States Patent No. 2,526,038, issued to Herbert Nelson; United States Patent No. 2,790,324, issued to Maynard A. Babb; and United States Patent No. 2,921,210, issued to Edward Schaschl et al.

In such prior art devices, the electronic tube has been in the form of a diode, a triode, or a tetrode. Regardless of differences in structure between tubes, in accordance with the accepted theory of operation, the partial pressure of hydrogen within the envelope of the tube is increased while the tube is immersed in the fluid under investigation. This increase in pressure may be attributed to the migration of hydrogen ions through the wall of the tube shell to the interior surface thereof where the hydrogen ions combine with electrons in the tube wall to form hydrogen gas. The rate of diffusion depends not only on the diffusion and desorption characteristics of the wall but also upon the effusion properties of the fluid in which the tube is immersed. Since the effusion property depends upon the fact that the fluid is in contact with the wall of a metal object, it is sometimes referred to hereinafter as the hydrogen-effusion-into-metal charaacteristic of the fluid.

In a hydrogen detector probe that is in the form of a tetrode, electrons emitted by the cathode are accelerated toward the screen grid by an amount controlled in part by the positive potential applied to the screen grid and in part by the negative potential applied to the control grid and in part by the manner in which the emissivity characteristics of the cathode varies with temperature. These electrons bombard and ionize hydrogen gas present in the envelope. The positive ions thus produced are collected at the plate to which a negative potential is applied. The current flowing in the plate circuit is substantially proportional to the pressure of the hydrogen in the envelope. In practice the various electrodes within the envelope of the electronic tube, whether it be a tetrode or other type of tube, are connected to external prongs or terminals and these prongs are plugged into a socket having prong receptacles which are connected by means of conductors to a power supply and a measuring circuit at points remote from the tube.

According to the present invention, the reliability of the measurements made with the probe is improved by the employment of a special holder and by the employment of means for regulating the electron emission from the cathode and the electron acceleration voltage. In accordance with this invention, provision is made for prevention of leakage of moisture or other conducting vapors to the tube prongs and the conductors connected thereto in the holder. In addition, voltage-regulating means is employed for stabilizing the electron emission from the cathode and for stabilizing electron acceleration voltage applied to the accelerating electrode. In addition, by employing electrostatic shielding about the prongs of the probe and the otherwise unshielded portions of certain conductors in the holder, the electrostatic induction of noise and stray alternating-current fields into the signal circuits is substantially eliminated. By the elimination of such noise and the stabilization of the electron emission and the electron accelerating voltage, both the sensitvity and linearity of the hydrogen detection system are improved.

Accordingly, the principal object of the present invention is to provide improved testing apparatus for measuring the hydrogen effusion properties of a fluid.

Another object of the invention is to provide an improved holder for use with a hydrogen detector probe from which holder moisture and other conducting vapors are excluded.

Another object of the invention is to provide an improved hydrogen detecting apparatus employing a combined holder and probe with means for excluding electrically conductive vapors from the signal conducting elements therein.

Another object of the invention is to provide an improved hydrogen detecting apparatus employing a combined holder and probe with shielding means for preventing induction of stray fields in the signal conducting circuits.

Other objects of this invention and various pertinent aspects thereof will become apparent to those skilled in this art upon reference to the following specification and the accompanying drawings wherein an embodiment is set forth.

In the drawings:

FIG. 1 is an elevational view illustrating testing equipment of this invnetion and indicating an environmental situation during a test;

FIG. 2 is primarily a vertical sectional view on an enlarged scale through the testing unit shown in FIG. 1;

FIG. 3 shows the wiring diagram for the apparatus of FIGS. 1 and 2;

FIG. 4 is an elevational view illustrating the testing apparatus of the invention employed in another environmental situation; and FIG. 5 is a schematic wiring diagram of the wiring system.

This improvement involves a protected tubular mounting or holder for a more or less typical electronic vacuum tube used for testing for the amount of hydrogen effusing from fluid such as a liquid bath. For this purpose the vacuum tube may be a standard 6V6 tube that has been somewhat modified for the particular purpose. As illustrated in FIGS. 1, 2, 3 and 4 the mentioned holder or mounting is generally indicated as a cylinder 10, and the vacuum tube to be employed with such mounting during testing is generally indicated as a somewhat modified tube 11. The elements of the tube 11 are connected by means of conductors to be described to a measuring circuit 60 which includes among other elements a meter M1 for indicating a hydrogen effusion property of the fluid to which the tube 11 is exposed. When using the holder of this invention spurious signals otherwise due to stray electrostatic fields and leakage of vapor into the socket are substantially eliminated.

The holder or mounting 10 constitutes a cylindrical housing which acts as a protecting and shielding manipulator to handle the tube 11 during the testing of a solution such as that designated S in FIGS. 1 and 4. Such holder includes various shielding means or barrier means that protect and shield the various electrical conductors, passing therethrough from the tube 11, so as to protect such conductors from variable electric fields which might otherwise disturb the test readings and to prevent the flow of vapor into the holder.

Since the function of this manipulating holder 10 is primarily related to the vacuum tube 11, and to the conduction of electrical signals from elements of the tube to metering equipment by which the tests are read, it seems desirable first to describe the modified vacuum tube 11 and its functioning.

The tube 11 is shown in general as a standard vacuum tube commonly known on the market as a 6V6 tube. This tube is connected in a special circuit as described below in order to measure the amount of hydrogen permeating the tube from a liquid S, thereby forming a hydrogen atmosphere within the tube.

The envelope of such tube comprises a metal shell 12 and base 14. The surface of the tube is modified for the present testing purposes by a suitable coating which is presently to be described. The metal of the shell 12 is desirably composed of steel, which is permeable to hydrogen, but other metals as herein later mentioned which are also permeable to hydrogen may be employed. The shell 12 is conventionally sealed to a plastic insulating base 14 which carries a plurality of prong-shaped terminal pins 15 conventionally connected with leads to electrodes within the shell. These electrodes typically include an indirectly heated cathode 16, an inner control grid or emission control grid 18, an outer grid or accelerator grid or screen grid 20, and a collecting electrode or plate 22. Also, a heater 24 for the cathode 16 is provided.

In addition, such a standard vacuum tube carries on its inner wall a localized deposit 26 of gettering material, as generally indicated in FIG. 2. This gettering material has been evaporated within the envelope for the purpose of furthering evacuation of the tube by absorption of gases following normal evacuation of the tube by a vacuum pump to a pressure in the order of $10^{-2}$ or $10^{-4}$ mm. Hg. Such gettering material may, for example, consist of barium salts in combination with salts of aluminum or beryllium which when evaporated ("flashed") produce deposits of free barium, or other material capable of absorbing residual gas remaining in the envelope after the sealing following the evacuation by the vacuum pump.

As is well known, such gettering material absorbs residual gases contained within the envelope of such a vacuum tube, thereby reducing the gas pressure to a much lower value, such as to a pressure of $10^{-7}$ mm. Hg. In some cases, the deposit of gettering material is at the upper end of the tube, instead of being at the lower end, as shown. In other cases, the deposit of gettering material is on the side of the tube. On the other hand, it is also possible to produce such high vacuums with special pumps or with getters that operate only when turned on—as with special auxiliary filaments. In such cases, gettering deposit masking on the tube surface is not necessary, but windows to control differences in gas permeation rates due to variations in shell structure or composition are required in order to give satisfactory results.

In the probe 10 illustrated, the outer wall of the shell 12 is coated with a hydrogen-impermeable layer 30 over a portion of the external surface thereof, but leaving a restricted portion 32 of the shell free of such coating material, thus forming a hydrogen-permeable or hydrogen-pervious, window 34. The layer on the coated portion of the shell thus forms a barrier to the flow of hydrogen into the interior of the tube, while the uncoated portion forms a hydrogen-permeable window which permits the flow of hydrogen into the interior of the tube through the window 34.

The portion of the shell 12 opposite the deposit 26 of gettering material is coated with hydrogen-impermeable material, thereby locating the window 34 in an area of the shell which is free of gettering material, or at least has a small proportion of gettering material deposited thereon. In this way, maximum hydrogen permeability is achieved for a window of given size. Furthermore, irregular absorption of hydrogen by the gettering material that would otherwise occur if the hydrogen flowed through a portion of the shell opposite the coating 26 of gettering material is avoided. This not only makes it possible to form windows having predetermined hydrogen permeation characteristics in a series of tubes, but also preserves the life of the gettering material so that its gaseous absorption properties are preserved for a longer period. In this way, the gettering material is available for absorbing hydrogen gas from the space within the tube. In this connection, it will understood that the hydrogen-gaseous atmosphere developed within the interior of the envelope due to the flow of hydrogen through the window 34 is gradually absorbed by the gettering material 26, until the gettering material has become saturated with hydrogen, or in other words, until the hydrogen absorption ability of the gettering material has been greatly reduced or exhausted.

There are a number of materials, such as natural or synthetic resins, which are impervious to hydrogen and which may be readily applied in the form of solutions by painting them onto the surface of the shell 12, or by dipping, or by spraying. In the case of dipping or spraying, the desired area for the window 34 may be conveniently masked, as by means of an adhesive masking tape useful for the purpose. For example, "chemical masking tape" may be used for this purpose during dipping or spraying. If such material is used, it is removed prior to use of the tube as a probe.

The well-known epoxy resins, in solution form or in other appropriate liquid form, are useful for the indicated purpose, as are other known synthetic resins in solution or other satisfactory liquid form, such as the well-known vinyl paints which need not be baked. Other coating materials are baking-type black lacquer and so on.

An epoxy resin suitable for use in making a window with this invention is the epoxy resin known as Shell 1001. This resin has an epoxy equivalent of 500, that is, it has 500 epoxy groups per mole. To prepare such an epoxy resin for use as a coating material it is dissolved in a suitable solvent such as butyl alcohol, glycol monobutyl ether (butyl "cellosolve"), xylene, or toluene, or compatible mixtures thereof. Pigments may be added in order to color the tubes. Prior to application of such coating material a suitable catalyst is added for accelerating the hardening of the coating when it is applied. A tertiary amine adduct made from Shell 1001 and containing free amine groups is a suitable catalyst. After coating the probe the resin is normally cured for 3 hours at 300° F. Likewise when small quantities are applied to the edges of a window in order to alter the size of the window, it is cured by baking for 3 hours at 300° F. Such a coating is able to withstand temperatures of 350° F. for 72 hours without discoloring, peeling, or otherwise deteriorating.

From the standpoint of the inner layer 26 of gettering material, barium is a common and satisfactory gettering agent, as are many other known materials. Since the tubes to be used for the purpose, such as the well-known 6V6 tubes, are commonly purchased on the market, they are used with such gettering materials as they may carry.

From the standpoint of the metal shell 12, any of the well-known hydrogen-permeable metals may be employed, such as platinum, palladium, and others well known because of their hydrogen-permeable characteristics. Palladium appears to be the most satisfactory metal for the indicated purpose, but others are usable such as iridium, ruthenium, osmium, and rhodium. For many purposes, however, it is satisfactory and more economical to employ commercially available 6V6 tubes which have shells that are made of steel. By employing such commercially available tubes and by forming hydrogen-permeable windows in them, a series of tubes having uniform hydrogen sensitivities may be readily produced economically, even though the permeability of the unwindowed shells to hydrogen may vary from tube to tube.

The holder 10, which receives the vacuum tube 11, includes a vapor-impermeable housing 35 formed from vapor-impermeable material such as nylon, Lucite or metal. The major portion of this housing 35 is in the form of a somewhat elongated cylinder which may be used as a handle for manipulating the vacuum testing tube 11 in a bath of solution S being tested. A lower portion of such housing 35 may, if desired, be reduced. This lower portion of the housing 35 contains in sealed relationship a plastic, glass, or ceramic insulating base or socket member 36 containing a series of metal tubular connectors or socket elements, or prong receptacles 38 which receive the prongs or pins 15 of the base 14 of the vacuum tube 11. To insure against corrosion, the metal tubular socket elements 38 and the prongs 15 are plated with gold or other non-corroding metal. In the particular form shown, the insulating base or socket member 36 is provided with a central keyed bore for receiving in proper relationship a central ribbed stem 39 of the vacuum tube 11, which stem also may be of insulating material.

The upper ends of the socket elements 38 are characteristically flattened and sealed or otherwise adapted to form lugs 40 for the soldering thereto of metallic electrical conductors 41, 42, 43, 55, 56, 58 and 59.

In order to shield the tube prongs 15, the socket elements 38 that receive the prongs, the soldered terminals 40, and the bare metal ends of the conductors 41, 42, 43, 52, 55, 56, 58 and 59 from the influence of extraneous electrical fields which might otherwise penetrate the housing 35, a tubular metal electrostatic shield 45 is arranged to encircle these elements. The shield encircles the lower end of the holder and the base 14 of the probe extending downward from a point above the solder points 40. The electrostatic shield 45 is composed of aluminum, copper, or other electrically conductive metal, thereby forming a single turn of a ring-shaped closed electric circuit. The upper portion of the shield is fixed snugly by a squeeze fit onto the lower end of the holder and is held in place thereon by suitable retaining means. Thus the upper edge of the shield 45 is embedded in or otherwise sealed to the housing 35 of the holder. The lower end of the shield is of slightly larger diameter than the base 14 so as to form a receptacle for the tube 11.

In order to provide for adequate exclusion of moisture from the area that encloses the solder joints 40, a vapor-moisture shield or barrier 46 of suitable thermosetting resin or plastic material is disposed in sealing relationship about the adjacent end portions of the various conductors at the lower end of the main body portion of the housing 35. In addition a vapor-moisture shield in the form of a plastic disc 46a is transversely mounted within the lower end of the housing 35. The disc is located between the socket member 36 and the upper ends of the lugs 40, and in contact with the upper end of the socket member 36. The disc 46a is sealed to the upper end of the socket member 36 and is sealed about the lugs 40 and to the inner surface of the reduced portion 35a of the holder. The latter shield prevents ingress of fluid through the key way and through the socket elements 38 when there is no probe in the holder. A tape 47, as later described, is used to seal the joint when the probe is mounted in the holder.

The indicated assembly of conductors, all of which carry appropriate insulating coverings, includes one grounded conductor 43 soldered to one of the terminals 40 to which there is connected a ground wire 50 that is connected to the circular metal shield 45. In addition to the wire 50, there is also connected to the grounded conductor 43 at the respective terminal 40 a ground wire 52 which leads down from the under side of a metallic closure cap 54 at the top of the housing 35. Current is supplied to the filament through conductors 41 and 42. The conductor 59 connects the cathode to the measuring unit 60. Also included in the assembly of conductors are three other conductors 55, 56 and 58. These conductors 55, 56, 58 and 59 are low-noise shielded conductors of the coaxial type whose metallic braided shields s have their ends imbedded in the plastic moisture 46. The shields are all insulated from the conductors at the holder 10.

The conductor 43 and all of the coaxial shields of conductors 55, 56, 58 and 59 are connected to the system ground G at the outer ends of the conductors where they are connected to the measuring circuit unit 60 as illustrated in FIG. 3. The measuring unit 60 includes a first meter M1 for measuring a characteristic of the tube 11 that depends upon the amount of hydrogen that has passed through the metal envelope at the window 34, and a second meter M2 used for standardizing the electron emission of the cathode 16.

All of the indicated conductors 41, 42, 43, 55, 56, 58 and 59 pass as a group out of the apparatus by way of a flexible sheath 62 which is formed of vapor-impermeable plastic material of any of the well-known types such as polyethylene, polypropylene, and neoprene. Such sheath passes out through the cap 54. However, for exclusion of vapor from the interior of the manipulating housing 35, the upper outer portion of the housing 35 above a bundle of end portions of the conductors, is filled with a thermoset plastic sealing plug 64. This sealing body imbeds all of the indicated conductors through an area below the inner end of the sheath 62, and it also prevents leakage of vapor through the sheath 62 into the cavity 65 in the lower portion of housing 35 by imbedding also the inner end of the sheath 62. It similarly encloses the grounding conductor 52 leading from the cap 54. In view of the vapor-impermeable properties of the plug 64 satisfactory results can usually be obtained even though the sheath may be vapor permeable.

When the tube is plugged into the socket, a strip 47 of adhesive vapor-impermeable tape is wrapped around and sealed to the tube base 14 and the shield 45. In this way seepage of liquid through the joint or seam 49 between the tube 11 and the holder 10 is prevented. The tape may be "Scotch" tape or any elastic chemical masking tape that is impervious to vapor and is chemically inert. In this manner, all the conductors leading from the terminals 40 in the lower end of the housing 35 out through the upper end thereof by way of the sheath 62 are properly shielded and protected.

As illustrated at the top of FIG. 2, the cap 54 is fitted over the top of the plastic insulating plug 64. This may be done by adjusting the ground wire 52 and setting the cap 54 down into operative position before the plug 64 has set. Screws 66 may then be used for retaining the cap 54 on the housing 35 as illustrated. In addition, a clamp element 67 may be mounted in a slot between annular portions of the cap 54 and there retained by means of screws 68 that engage mounting ears 65' of the cap 54. These ears are also employed as electrical grounding terminals for a purpose hereinafter explained. A protective sleeve 69 disposed about the adjacent end portion of the sheath 62 is employed within the clamp where the latter would otherwise bear upon the sheath 62. The sleeve 69 is composed of elastic plastic material and is compressed to protect the sheath 62.

Supplementing the above description, reference is made to FIGS. 3 and 5 which illustrate the relationship of the shielded coaxial cables 55, 56, 58 and 59, to the measuring unit 60 and to the meters M1 and M2, of which the meter M1 is a micromicroammeter. Thus, in these figures, especially in FIG. 3, it is shown that the shielded coaxial cable 55 leads from the screen 20 to the meter M2, that the shielded coaxial cable 56 leads from the control grid 18 to the slider 72, and that the shielded cable 58 leads from the collecting electrode or plate 22 to the micromicroammeter M1. In addition, the grounding of the metal shell 12 is accomplished through a connection 70 leading to the terminal 40 to which is connected the grounded conductor 43. One end of the heater 24 is connected to the unshielded conductor 41. The other end of the heater is connected to the shielded conductor 42. As indicated, the cathode 16 is connected to one end of the potentiometer 71 through the grounded conductor 44. The other end of the potentiometer 71 is connected to the negative terminal of the power supply PS. As mentioned previously, the inner or control grid 18 is connected through the shielded conductor 56 to the slide wire 72 of the potentiometer 71. The outer or screen grid 20 is connected through the meter M2 to the positive terminal of the power supply PS through the shielded conductor 55. The plate or collector 22 is connected through the shielded conductor 58 to the micromicroammeter M1 to the negative terminal of the power supply PS. The two conductors 41 and 42 are connected to the secondary winding of a filament supply transformer T. The shell 12, the heater filament 24, the shields of the conductors 55, 56, 58 and 59 and the negative terminal of the power supply PS are grounded by means of the single system ground connection G that is soldered to the conductor 41 at the measuring unit 60.

The voltage supplied by the power supply PS is of such a magnitude that electrons accelerated from the cathode 16 toward the plate 22 attain energies corresponding to those above the ionization potential of molecular hydrogen. In this system, the outer screen 20 is employed as an accelerator electrode. The plate 22 is employed as a positive charge, or positive ion, collector. The inner grid 18 is employed for setting the electron current formed within the tube at any desired value as indicated by the meter M2. By manipulating the slider 72 on the potentiometer 71, the current flowing through the tube at any time may be standardized, thus compensating for differences in the electron emissive properties of cathode 16 of different tubes, or for compensating for changes in the electron emissive properties of the cathode of any tube during the life of the tube. The effectiveness of the inner grid for this purpose arises from the fact that the 6V6 tube has a gradual, or remote, cut-off characteristic as distinguished from a sharp cut-off characteristic thus permitting a gradual change of current to be produced when the bias on the inner grid 18 relative to the cathode 16 is changed. The bias on the emission control grid 18 may also be adjusted when the probe is in use in order to adjust its sensitivity. Over a wide range of operation the ion current indicated by meter M1 is proportional to the emission current indicated by meter M2, as well as to the pressure of hydrogen gas within the tube. With the arrangement described above, the flow of moisture and other conductive vapors into the space containing the prongs 15 and the associated electrical connections of the holder, is prevented. It is exceedingly important that precaution be taken to exclude such conducting vapors from the system since the tube 11 and the lower portion of the holder 10 are both usually submerged below the upper level of the liquid undergoing test. By preventing the flow of moisture or other conducting vapor into this area, loss of reliability, and sensitivity that might otherwise arise from the presence of moisture or conducting vapor within the holder or in the joint 49 between the holder and the tube, are eliminated.

In order to further reduce effects of moisture and other vapors on the electric circuit the various parts of the measuring circuit are enclosed in a moisture proof metallic cabinet 78 and the conductors of the cable 62 are connected with the wires within the cabinet through a vapor-proof socket 80. Furthermore, the portions of the conductors within the cabinet are shielded electrostatically by connecting the case 78 to the system ground G.

In order to stabilize the electron emission from the cathode 16 and the accelerating voltage to which the electrons are subjected, a regulated power supply PS is employed. In the regulated power supply shown, alternating current from the power mains M is applied through a line voltage regulator 100 such as a Sola regulator, to the primary winding 101 of a transformer 102. One secondary winding 103 of this transformer is employed for supplying heating current to the filament 24. Another secondary winding 104 applies the voltage to a rectifier 105 which supplies direct current voltage to the system through a voltage regulator 106. The negative terminal of the regulator 106 is connected to the system ground. The positive terminal is connected to the accelerator grid 20. With this arrangement the emission current is regulated at a value established by the setting of the slider 72 and the voltage to which the electrons are accelerated is regulated at a fixed value established by the voltage regulator 106.

By the combined action of the vapor eliminating system, the electrostatic shielding system, and the voltage regulation system, drift of the collector current indicated by the meter M1 is greatly reduced. Furthermore, by virtue of such regulation the current flowing through the collector is made more nearly proportional to the pressure of hydrogen in the tube 11. By virtue of the regulating system, and the moisture proofing, and the electrostatic shielding arrangement, small amounts of hydrogen present in the tube 11 can be detected and the partial pressure of small quantities of hydrogen as well as large quantities of hydrogen can be accurately measured.

In operation, hydrogen effusing from the liquid diffuses through the window 34 of the tube 10 to the inner surface thereof. At the inner surface the hydrogen is desorbed, thus increasing the pressure of hydrogen gas existing within the envelope 11. As mentioned above, the hydrogen may flow through the wall in the form of a positive ion current, combining somehow with electrons at the inner surface of the envelope, thereby forming atomic hydrogen. Such atoms of hydrogen then combine with each other within the envelope, probably at the inner surface of the shell, to form molecular hydrogen which thereby establishes a molecular hydrogen atmosphere within the envelope. Regardless of the explanation of the phenomena involved, the fact is that the amount of hydrogen gas within the envelope is increased when the tube is immersed in a liquid which is capable of causing such diffusion of hydrogen into the envelope.

In the process of accelerating electrons from the cathode 16 toward the accelerator grid 20, electrons travel at a high speed through the space between the cathode 16 and the accelerator grid 20. Thereafter, they are decelerated in the space between the accelerator grid 20 and the collector plate 22. Electrons that bombard hydrogen in the space between the accelerator grid 20 and the plate 22 ionize the hydrogen gas. As a result, electrons represented by the symbol $e^-$ and hydrogen ions represented by the symbols $H^+$, $H_2^+$, and $H_3^+$ are formed in the space within the envelope between the accelerator grid 20 and the collector plate 22. Such hydrogen ions, being positively charged, are repelled by the accelerator grid 20 toward the collector plate 22. When they strike the collector plate, they collect their missing electrons which therefore flow through the micromicroammeter M1. At the same time, electrons formed in the ionization process are drawn toward the accelerator grid 20. These electrons flow to the positive terminal of the power supply. Hydrogen ions and electrons are also formed in the space between the two grids by virtue of the bombardment of hydrogen gas in this region by the accelerated electrons. These hydrogen ions flow to the inner grid 18, where they are discharged, and these electrons flow to the outer grid 20. The latter hydrogen ions and electrons do not contribute to the current flowing through the micromicroammeter M1.

In practice, therefore, the magnitude of the current flowing through the meter M1 is a measure of the pressure of hydrogen gas present within the envelope 11 at any time. In practice, it is observed that when a probe 10 exposed to fluid is first energized, the magnitude of the current flowing through the meter M1 changes as a function of time. For this reason, measurements are made after the current has become stabilized, or else has fallen below some predetermined value. Then the probe is immersed in the fluid under test and the rate at which the ion current increases, is measured after the exposure of the probe to the fluid.

In normal usage, when a probe is first energized the ion current rises rapidly to a high peak value which may exceed $10^{-7}$ amp. This current arises from the fact that the initial heating of the probe, especially the initial heating of the cathode causes some of the gases that have previously been absorbed on various electrodes and the internal surface of the shell to be desorbed. While the probe remains warm these gases are adsorbed by the gettering material, gradually reducing the ion current to a value of $4 \times 10^{-9}$ amp. or less. The time required for the ion current to reach such a sufficiently low value to permit subsequent significant measurements to be made varies between 10 to 30 minutes, if the tube has once been previously properly prepared.

When a probe is not in use, the hydrogen gas within the tube becomes absorbed by the gettering material, thus restoring the probe to its normal quiescent low pressure condition. When so restored, the tube may be used again. However, when the hydrogen absorption capacity of the getter has been exhausted, as when the gettering material becomes saturated with hydrogen, the pressure of the hydrogen atmosphere remains high and the tube calibration is altered, thus requiring replacement of the tube.

As mentioned above, when using the same probe to measure the effusion properties of a series of liquids the tube is cleaned up between tests to remove hydrogen gas from the space within the envelope. This is most easily done by maintaining the probe at an elevated temperature between tests. In the simplest way of performing this operation the probe is connected with a power supply which energizes the various electrodes including the cathode. Unless the probe is heated to remove hydrogen the gettering process would require 24 hours or longer to be reasonably effective. By heating the probe during the clean-up process the gettering action is accelerated thus making it possible to prepare the tube for reoperation within a short period of about 30 minutes under ordinary usage. In case a commercial 6V6 tube is employed as a probe the temperature of the tube is maintained at an elevated temperature below about 190° C. during the clean-up process. The reason for this is that commercial 6V6 tubes generally employ barium as the gettering material and barium desorbs hydrogen and other gases above about 200° C.

When the probe 10 is employed to measure hydrogen permeation from a liquid S as indicated in FIG. 1 the probe 10 is often held in the liquid S manually. When so supported the electrostatic shields about the coaxial cables 55, 56, 58, and 59 and the ring-shaped electrostatic shield 45 cooperate to prevent stray electric fields from being capacitively induced by the hand into the circuit at the socket. In effect the noise produced by electrostatic induction is reduced by virtue of the fact that coaxial cables, or shielded conductors, 55, 56, 58, and 59 are employed to connect the circuit 60 to the ungrounded electrodes of the tube 11 and partly due to the fact that the otherwise exposed portions of the tube prongs 15 and the conductors that are connected to the lugs of the prong receptacles of the socket are surrounded by the electrostatic shield 45.

In practice the probe 11 and the reduced portion 35a of the holder are often supported beneath the liquid level. The tape 47 prevents the flow of moisture and other conducting liquids and vapors through the seam between the abutting surfaces of the socket 10 and the tube 11. Likewise, by virtue of the vapor-impermeable characteristics of the manipulator 35 of the holder and of the sealing members 46 and 64, the flow of vapor and liquid by diffusion or otherwise through the holder to the socket terminals and the tube terminals is prevented.

As a result, therefore, of this invention the current flowing from the collector 22 through the meter M1 is an accurate measure of the amount of hydrogen that is within the tube at any time. This measurement is undisturbed by any spurious current components that might otherwise be present because of permeation of conducting vapor into the tube through the base. It is also undisturbed by signals that might otherwise be electrostatically induced in the conductors when the holder 10 is employed to manually support the tube 11 in the liquid.

In FIG. 4 there is shown an arrangement for applying a voltage between the shell 12 of the tube 11 and an electrode 90 supported in the liquid S. The circuit for applying this potential includes a battery B, a double-pole double-throw switch 91, current meter 92, and a rheostat 93, connected between the electrode 90 and the terminal formed by the clamp 67. The latter terminal, as will be understood from the foregoing description, is electrically connected through the cap 54, and the conductors 52 to the grounded conductor 43 and the shell 12. By setting this switch 91 to apply a positive potential to the electrode 90 relative to the shell 12, hydrogen ions from the liquid can be driven into the shell. This occurs, for example, if the liquid S is composed of an electrolyte which is employed for plating the shell. In this case, as well as in the case illustrated in FIG. 1, this invention makes it possible to obtain more reliable and accurate measurements of the hydrogen in the tube at any time and hence more accurate measurements of the hydrogen-permeation properties of the liquid undergoing test.

In this specification the terms "effusion," "diffusion," "permeation," and "desorption" have been employed to describe various phenomena that affect the flow of hydrogen from a body of liquid through the shell of a probe into the space within the shell. The effusion property refers to a property of the liquid. It represents the ability of the liquid to supply hydrogen to the external surface of a probe or to the external surface of a solid object that is immersed in a liquid. This ability may be due to electrical characteristics, chemical characteristics, or others. The term "diffusion" refers to the migration of hydrogen from one point to another within the material composing the shell of the probe or the object. The term "desorption" refers to the ability of a surface to cause hydrogen contained within the wall or within the object to emerge from the surface in gaseous form. The term "permeation" refers to the over-all ability of a wall member to permit the flow of gas through the wall from the space on one side thereof external to the wall to the space on the other side thereof external to the wall. It is thus seen that in the flow of hydrogen from the liquid under test into the space within the shell of the probe, the hydrogen effuses from the liquid through the external surface of the shell into the body of the shell. There the hydrogen diffuses to the internal surface of the shell. At this point the hydrogen is desorbed thereby forming a gaseous atmosphere within the shell. The permeability of the shell depends upon the diffusion characteristics of the shell material and also the desorption characteristics of the internal surface, and also on the nature of the interaction between the external surface and the fluid undergoing investigation.

While the probe of this invention may be used in many ways and with many circuits, it is clear from the foregoing description that a novel hydrogen detection system of greater reliability is provided. While the invention has been described with respect to only specific embodiments thereof, it will be understood by those skilled in the art that it may be applied in many other ways. For example, though the invention has been described as being applicable to a tetrode, some features may also be applied to triodes and even to diodes. Furthermore, while the invention has been described with specific reference to the most important application thereof known, namely, to the measurement of the hydrogen effusion characteristics of liquids in which a probe is immersed, it will be understood that the invention is also applicable where the tube is exposed to gaseous fluids or other hydrogen-bearing atmospheres. It is, therefore, to be understood that the invention is not limited to the specific embodiments and applications thereof described, but that it may be embodied in many other forms, and that various other materials may be employed, and that it may be used with other circuits and in other environments than those specifically described herein.

The invention claimed is:

1. In combination:
a vacuum tube holder having an outer wall providing an interior thereof and having a sealed base provided with first electrical connectors in said base, said holder including means for preventing flow of fluid through the outer wall thereof to the interior thereof toward said base and said first electrical connectors;
electrical conductors connected to said electrical connectors in the interior of said holder, said conductors forming a cable extending away from said holder;
a sealed vacuum tube having a shell and a base provided with second electrical connectors mating with said first electrical connectors, said base of said vacuum tube being mounted on the base of said holder and having a plurality of electrodes connected to said second electrical connectors and forming a joint between said holder and said tube, the shell of said vacuum tube having a portion thereof which is hydrogen-permeable;
moisture-impermeable means sealing the joint between said holder and said tube against the flow of moisture into said joint; and
circuit means connected to the ends of said conductors extending away from said holder and said tube, said circuit means comprising ion current generating means connected to the ends of said connector means that are remote from said ends of said conductors for causing hydrogen gas in said tube to become ionized and to generate a hydrogen ion current, said circuit means also including means for measuring the magnitude of said hydrogen ion current.

2. The combination as defined in claim 1 wherein:
the electrodes of said vacuum tube include a cathode, a control grid, a screen grid, and a plate, connected respectively with different ones of said second electrical connectors; and
wherein said ion current generating means comprises means for applying electron current control potentials to said cathode, said control grid, and said screen grid, and for applying a hydrogen ion collecting potential to said plate.

3. The combination as in claim 2 wherein said holder comprises an electrostatic metallic shield about the inner ends of said first electrical connectors and their connections with said conductors.

4. The combination as in claim 3 wherein an insulating moisture barrier is disposed in said holder inwardly from the base therein and provides a zone enclosing said electrical connectors and their connections with said conductors.

5. The combination as in claim 4 wherein said moisture barrier and the insulating base of said holder enclosure a chamber within said metallic shield in which said first electrical connectors and said connections are positioned.

6. The combination as defined in claim 3 wherein said shell is composed of metal and in which said metallic shield extends from a point opposite said shell to a point opposite said first mentioned electrical connectors, shielding means enclosing said electrical conductors from a point with said metallic shield to a point adjacent said circuit means.

7. The combination as defined in claim 3 wherein said ion current generating means comprises; a filament indirectly heating said cathode and a regulator power supply adapted for connection to a source of alternating current, said power supply including means for regulating the current flowing through said filament and means for regulating the voltage applied between said cathode and said screen grid.

8. The combination as defined in claim 7, including means for adjusting the voltage applied between said cathode and said control grid.

9. In apparatus for measuring hydrogen effusion properties of fluids, a holder for a hydrogen detector probe comprising:
a sealed vapor-impermeable housing member having two spaced apart conductor support portions;
an insulating vapor-impermeable base sealed in one of said support portions of said housing member, said base having electrical connectors provided with inner detaching terminals for mating with ends of connectors of a vacuum tube;
conductors extending through said other supporting portion of said housing member and having bared ends electrically joined to the inner terminals of said electrical connectors;
an insulating vapor-impermeable barrier element disposed in said housing member inwardly from said sealed base and sealed in said housing member and around said bared conductor ends and said electrical connectors to provide a hydrogen-free space containing said bared ends;
a vapor-impermeable plug sealing said other supporting portion of said housing member and said conductors leading outwardly through said plug in sealed relation to the plug;
one of said conductors being a grounding conductor, and said housing member carrying a metal closure cap externally of said insulating plug, said cap being electrically connected with said grounding conductor, and an electrical connector on said cap for connecting an external circuit to said cap.

10. In apparatus for measuring hydrogen effusion properties of fluids, a holder for a hydrogen detector probe comprising:
a sealed vapor-impermeable housing member having two spaced apart conductor support portions;
an insulating vapor-impermeable base sealed in one of said support portions of said housing member, said base having electrical connectors provided with inner detaching terminals for mating with ends of connectors of a vacuum tube;

conductors extending through said other supporting portion of said housing member and having bared ends electrically joined to the inner terminals of said electrical connectors;

an insulating vapor-impermeable barrier element disposed in said housing member inwardly from said sealed base and sealed in said housing member and around said bared conductor ends and said electrical connectors to provide a hydrogen-free space containing said bared ends;

a thermostatic metal shield surrounding said terminals and joined bared conductor ends to shield such terminals and conductor ends electrostatically, said shield extending beyond said terminals to provide a receptacle for insertion of such hydrogen detector probe;

one of said conductors being a grounding conductor and said metal shield is electrically connected therewith.

11. Apparatus as in claim 1 wherein one of said conductors is a grounding conductor that is connected to one of said first electrical connectors, and other of said first connectors are connected to other conductors, and comprising shielding means encircling said other conductors, said shielding means being free from connection with any connector within said holder, said shielding means and said grounding conductor being connected together at a point remote from said holder.

12. Apparatus as in claim 11 including an electrical terminal connected to said grounding conductor and mounted on said holder externally thereof for connecting said grounding conductor to a circuit adjacent said holder.

13. In apparatus for measuring hydrogen effusion properties of fluids, a holder for hydrogen detector probe comprising:

a sealed vapor-impermeable housing member having two spaced apart conductor support portions;

an insulating vapor-impermeable base sealed in one of said support portions of said housing member, said base having electrical connectors provided with inner detaching terminals for mating with ends of connectors of a vacuum tube;

conductors extending through said other supporting portion of said housing member and having bared ends electrically joined to the inner terminals of said electrical connectors;

an insulating vapor-impermeable barrier element disposed in said housing member inwardly from said sealed base and sealed in said housing member and around said bared conductor ends and said electrical connectors to provide a hydrogen-free space containing said bared ends;

an electrostatic metal shield surrounding said terminals and joined bared conductor ends to shield such terminals and conductor ends electrostatically, said shield extending beyond said terminals to provide a receptacle for insertion of such hydrogen detector probe; and one end of said shield being imbedded within said barrier element.

References Cited by the Examiner

UNITED STATES PATENTS

| | | | |
|---|---|---|---|
| 2,334,356 | 11/1943 | Salzberg et al. | 324—33 |
| 2,595,611 | 5/1952 | Simpson et al. | 324—33 |
| 2,813,922 | 11/1957 | Arnold | 339—218 |
| 2,827,618 | 3/1958 | Chapman et al. | 339—218 |
| 2,921,210 | 1/1960 | Schaschl et al. | |
| 2,946,952 | 7/1960 | Marsh et al. | 324—33 X |
| 2,949,642 | 8/1960 | Lieberman | 339—218 X |
| 2,991,441 | 7/1961 | Butler et al. | 339—218 X |

OTHER REFERENCES

Norton, Francis J.: "Diffusion of Hydrogen from Water Through Steel," 324–33 J. of Applied Physics, volume 11, No. 4, April 1940, pages 262–267.

WALTER L. CARLSON, *Primary Examiner.*

LLOYD McCOLLUM, FREDRICK M. STRADER, *Examiners.*